United States Patent [19]
Howie

[11] 3,869,596
[45] Mar. 4, 1975

[54] COOKWARE HEATER
[75] Inventor: John R. Howie, Killingworth, Conn.
[73] Assignee: Safeway Products Inc., Middletown, Conn.
[22] Filed: Sept. 28, 1973
[21] Appl. No.: 401,681

[52] U.S. Cl................ 219/438, 117/212, 219/464, 219/543
[51] Int. Cl............................................ F27d 11/02
[58] Field of Search ................ 106/52, 39; 117/212; 174/68.5; 219/216, 345, 385, 432, 438, 460, 461, 464, 48, 543; 340/324; 346/76 R; 338/308, 309

[56] References Cited
UNITED STATES PATENTS
| | | | |
|---|---|---|---|
| 2,603,740 | 7/1952 | Del Buttero | 219/438 X |
| 2,859,321 | 11/1958 | Garaway | 219/543 X |
| 2,939,807 | 6/1960 | Needham | 117/212 |
| 3,086,101 | 4/1963 | Scofield | 219/460 |
| 3,191,004 | 6/1965 | Hocker | 219/461 |
| 3,496,336 | 2/1970 | Hingoramy et al. | 219/464 |
| 3,505,498 | 4/1970 | Shevlin | 219/461 |
| 3,679,473 | 7/1972 | Blatchford et al. | 117/212 |
| 3,781,528 | 12/1973 | Schrewelius | 219/546 |

FOREIGN PATENTS OR APPLICATIONS
462,942   1/1950   Canada........................... 219/438

Primary Examiner—Volodymyr Y. Mayewsky

[57] ABSTRACT

A cookware heater and method of manufacture thereof is presented wherein a heating circuit of the printed circuit foil type is bonded to a ceramic or metallic cookware item. A layer of high temperature dielectric material is sandwiched between the heater circuit foil and the cookware item, and the coefficients of expansion of the cookware material, and the heater circuit foil are closely matched to each other.

9 Claims, 5 Drawing Figures

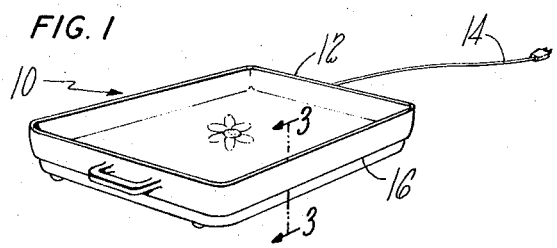
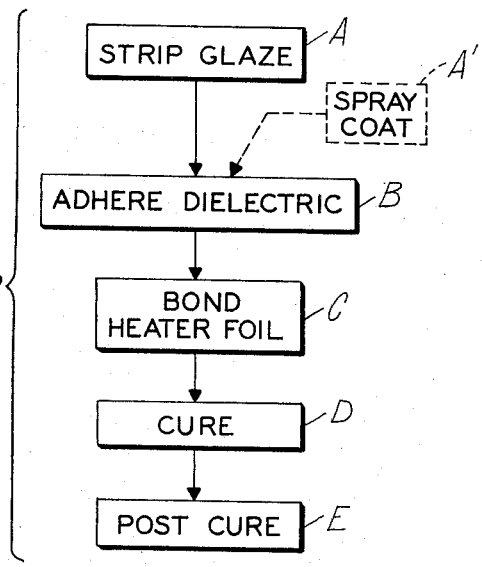
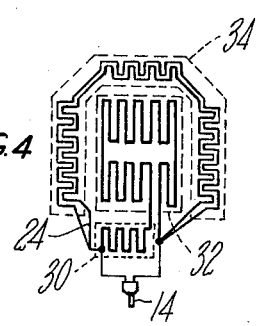
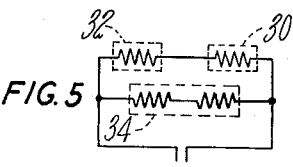
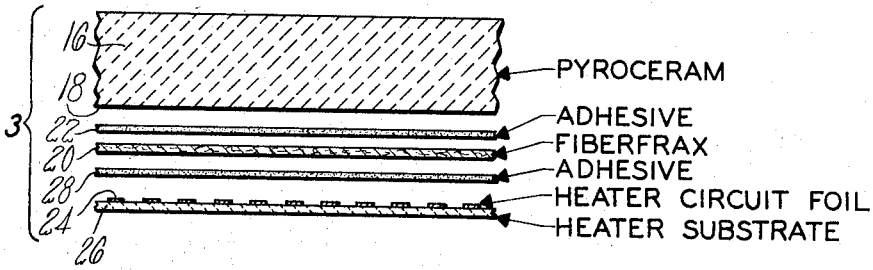

COOKWARE HEATER

BACKGROUND OF THE INVENTION

Cookware of the glazed pottery or ceramic type is a very popular item in widespread use. One of the most popular types of such cookware is the type known as Corningware (Corningware being a registered trademark of Corning Glass Works), a ceramic cookware item made from a type of ceramic material known as Pyroceram (Pyroceram being a registered trademark of Corning Glass Works). Similar utensils, containers and cookware items for kitchen use are made of porcelain, clay, stoneware, earthenware, and specially prepared glass or other similar heat resistant substances. Many of these ceramic or glass items have a glazed finish, and they are commonly used to hold food during the course of cooking, such as in an oven or on a stove, and for service after cooking. However, while metal cookware having self-contained resistance wire heating elements have been known for some time, no satisfactory self-contained heating configuration for these ceramic cookware items has heretofore been constructed. Furthermore, the metal cookware items with self-contained heating elements have typically been of the heating rod or coil type wherein the rod or coil is spaced from the cooking surface which results in a waste of a considerable amount of energy.

SUMMARY OF THE INVENTION

In the present invention an electrically heated ceramic cookware unit is formed wherein a heating unit is bonded to the cooking plate, the heating unit containing a layer or coating of high temperature dielectric material bonded to the outer surface of the ceramic cookware unit and a printed circuit type foil heater circuit bonded to the layer of dielectric material. For those ceramic units such as the Corningware utensils which normally have a glazed outer surface, the glaze is removed in the area of the cooking plate at which the layers of dielectric and printed circuit are bonded. The coefficient of expansion of the circuit foil is closely matched to the coefficient of expansion of the material from which the cookware unit is formed. The layer of dielectric material may either be a coating applied directly to the cookware unit, or it may be a separate thin layer of relatively flexible material adhesively bonded to the ceramic cookware unit. The printed circuit heating element is adhesively bonded to the dielectric layer with the resistive foil adjacent to the dielectric material. The adhesive material is a thermosetting adhesive which retains some flexibility after curing. Since the adhesive and the dielectric are adhesive, matching of their coefficients of expansion to the foil and cookware unit is not critical.

The assembled unit is subjected to a curing cycle at a pressure range of from 15 psi to 100 psi at a temperature ranging from 250°F to 350°F for a time ranging from 60 minutes to 20 minutes. After the curing cycle has been completed, the unit is post cured for a minimum of two hours at a temperature at least equal to the normal end use anticipated operating temperature which is on the order of 450°F.

The apparatus and method of the present invention can also be applied to cooking utensils of metallic construction whereby the standard rod or coil heating unit can be replaced with a printed circuit foil heating element. To bond the foil heating element to a metal cooking utensil, the bottom of the metal cooking utensil is first spray coated with a layer of porcelain or other ceramic material to provide a mat finish. A layer of dielectric material and the printed circuit heating element are then bonded to the unit in the same manner and construction as described above with respect to the ceramic cooking utensils.

Accordingly, one object of the present invention is to provide a novel and improved cooking unit and method of formation thereof.

Still another object of the present invention is to provide a novel and improved ceramic cooking unit and the method of formation thereof.

Still another object of the present invention is to provide a novel and improved ceramic cooking unit and method of formation thereof, particularly a cooking unit made of pyroceramic material.

BRIEF DESCRIPTION OF THE DRAWINGS

Referring now to the drawings:

FIG. 1 is a perspective view of a cookware unit in accordance with the present invention.

FIG. 2 is a block flow diagram depicting the method of forming the cookware unit of the present invention.

FIG. 3 is a partial sectional view, taken along line 3—3 of FIG. 1, showing a detail of the construction of the cookware unit of the present invention.

FIG. 4 is a plan view illustrating a typical configuration or pattern of the heating element of the present invention.

FIG. 5 is an electrical schematic of the heating circuit of the present invention.

DESCRIPTION OF THE PREFERRED EMBODIMENT

In the following description of the preferred embodiments, the invention will be described in terms of a heating circuit bonded to Pyroceram ceramic material commercially distributed in the form of Corningware cooking utensils and dishes. However, it will be understood that the invention is generally applicable to various utensils and containers made of material generally designated as ceramic, porcelain, clay, stoneware, earthenware, or specially prepared glasses or similar heat-resistant substances, all of which will be referred to generally as "ceramic" hereinafter. A specific application to metallic pots or pans will also be discussed. The Pyroceram ceramic material is generally known and identified by various physical properties such as the following: dielectric constant (at room temperature and 1 MHz) 5.5 – 6.3; loss factor (at room temperature and 1 MHz) 0.01–0.07; dielectric strength (VPM) 250–300; specific gravity 2.4 – 2.6; thermal conductivity (BTU/HR/sq. ft/°F/ft.) 1.1 – 2.1; thermal coefficient of expansion ($10^{-6}$in./in./°C) 0.2 – 4. In particular, the general purpose Pyroceram ceramic material No. 9608 used in making cooking utensils has a thermal coefficient of expansion of 0.2–1.1 × $10^{-6}$in./in./°F (0.36–1.98 × $10^{-6}$in./in./°C). Reference is hereby made to U.S. Pat. No. 2,920,971 to Stookey for purposes of incorporation herein of pertinent material and data relating to Pyroceram and Corningware, that patent having been identified in published reports as covering the Pyroceram material.

Referring now to FIG. 1, a cookware unit 10 is shown which has a generally dish-shaped rectangular body 12 of Pyroceram 9608 ceramic material. An electrical cord 14 extends from a printed circuit heating element bonded to the bottom or base 16 of the cookware unit.

Referring now to FIG. 3, a partial sectional view of the base 16 of the cookware unit is shown. The view of FIG. 3 is an exploded view showing the various adherent layers which form the heating assembly bonded to the exterior surface of the bottom of the cookware unit. The typical ceramic cookware unit has a glazed outer surface, and this glazed outer surface in the area where the heater is to be mounted is removed to present a mat finished surface 18 at the exterior of base 16. A layer of high temperature dielectric material 20 is bonded by adhesive 22 to mat surface 18, and a printed circuit heating element consisting of a heater circuit foil 24 mounted on a substrate 26 is bonded by adhesive 28 to dielectric layer 20, and hence to the cookware unit. Cord 14 is connected to heater circuit foil 24 in any desired fashion to pass an electric current through the circuit foil for the purpose of heating the cookware unit.

While the material from which the cookware unit is formed is generally considered to be an electrical insulating material, substantial drop-offs, in the dielectric strength at the standard operating temperature of around 450°F has been noted, and the dielectric layer 20 is incorporated to electrically insulate the printed circuit heating element from the main body of the cookware unit. The dielectric layer 20 may either be a discrete sheet of insulating material such as an alumina-silica fiber bonded sheet of the type known as Fiberfrax paper (available from The Carborundum Company, Niagara Falls, N.Y.), or it may be a sprayed coating of such alumina-silica material or other insulating material such as aluminum oxide. If it is a sprayed coating, then the coating will be bonded directly to mat surface 18 and adhesive layer 22 can be eliminated.

The ceramics, such as Pyroceram, generally used and available for cookware utensils have a low thermal coefficient of expansion. It is of extreme importance in the present invention that the thermal coefficients of expansion of heater circuit foil material 24 be reasonably closely matched to the thermal coefficient of expansion of the base material from which the cookware unit is formed. The foil material should have a higher thermal coefficient of expansion than the base material, with an upper limit of a factor of 10. That is, the coefficient of thermal expansion of the foil material should be not less than nor more than 10 times the coefficient of thermal expansion of the base material. Circuit foil material having a thermal coefficient of expansion of $2.8$–$3.2 \times 10^{-6}$ in./in./C° ($1.56$–$1.78 \times 10^{-6}$ in./in./F°) meets this relationship and is commercially available. Both the adhesive and the dielectric layer (if in the form of a separate sheet) have a certain amount of flexibility and can thus accommodate expansion by physical distortion and so need not be as closely matched. The adhesive is of the type which remains flexible after curing so it can accommodate a certain amount of differential expansion between the adhesive parts and between itself and the adhered parts.

Referring now to FIG. 2, the method of forming the cookware unit of the present invention is shown. As depicted in step A, the glaze, if it is present, is removed from the exterior bottom of the ceramic unit to expose the mat surface 18. The dielectric layer 20 is then adhered to surface 18 in step B, either by spray coating or by adhesively bonding a sheet of insulating material. In step C the printed circuit heating element is mounted on the dielectric layer of applying the adhesive layer 28 and then applying the printed circuit heating element to the adhesive layer 28. In both step C and in step B if adhesive layer 22 is employed, the adhesive is a high temperature thermosetting adhesive material, and nominal coatings of 0.003 inches are used.

At this point in the formation process, the dielectric layer and the heating element are only lightly bonded to the bottom of the cookware unit, and an appropriate curing process must be undertaken to complete the bonding and formation of the finished unit. To that end, curing is accomplished in step D wherein the unit is cured at a pressure ranging from 15 to 100 psi at a temperature ranging from approximately 250°F to 350°F for a time period of from 60 minutes at the lower end of the temperature range to 20 minutes at the higher end of the temperature range. After the curing in step D, a post cure is employed in step E wherein the cured heater assembly is post cured for a minimum of 2 hours at a temperature at least equal to the normal end use anticipated operating temperature of the cooking unit which is about 450°F. As can be seen in FIG. 3, the heater substrate material 26, which is typically a fiberglass material to which the heater circuit foil is bonded, is on the exposed side of the final assembly. A protective coating may be placed over heater substrate 26 if desired, or the assembled cooking unit may be mounted within a mating base, if desired, for both appearance and protective purposes.

Referring now to FIG. 4, a typical pattern is shown for heater circuit 24. Three general areas are indicated by the dotted outlines 30, 32 and 34, corresponding, respectively, to a control area, and an edge area of the heater unit. The circuit pattern is arranged to provide three different power densities, the highest power density being in control area 30, the second highest power density being in edge area 34, and the lowest power density being in the central area 32. The highest power density is provided in control area 30 to compensate for heat losses to a heat collector for a thermostat control or other control device mounted in area 30 to control the temperature of the cookware unit. The second highest power density is established in edge area 34 (only one half of which is outlined in FIG. 4) to compensate for edge and side losses. Since heat losses are lowest in the central area, the lowest power density is established in the center. The configuration shown and described with respect to FIG. 4 results in essentially uniform heat distribution across the entire bottom surface of the cookware unit.

Referring now to FIG. 5, a simple schematic of the electrical circuit is shown. Power density areas 30, 32 and 34 are also shown, and it can be seen that a pair of parallel circuits are used to form the edge areas.

In accordance with the general concepts of the present invention, the heating element can also be mounted on a metallic cooking element such as a standard frying pan. In this embodiment, it has been found desirable to first spray coat the bottom of the metal cooking utensil with a porcelain or ceramic or other similar material to obtain an electrically insulating mat finish. Thus, the glaze stripping step of step A is replaced with step A' (shown in phantom in FIG. 3) wherein a porcelain layer is spray coated onto the exterior bottom of the metal cooking utensil. The remaining steps B, C, D and E are then completed as described with respect to the ceramic cooking utensil. Accordingly, whether the cooking unit is of the preferred ceramic type or has a metallic body, the final configuration is as shown and described with respect to FIGS. 1 and 3, with the only difference being in the material of the body and in the spray coating of a layer of porcelain for the metal utensil rather than stripping the glaze for the ceramic materials.

All of the previous discussion has been directed to a pan type cookware unit. However, it is to be understood that the present invention applies equally well to a flat sheet of material which may form part of a stove or counter top, in which embodiment the foil heating elements would be bonded, as taught herein, to the underneath side of the flat sheet.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A cooking unit including:
a cooking element formed of material selected from the group consisting of glass, ceramic and metal;
a base portion part of said cooking element having a mat surface and being electrically insulating;
a layer of dielectric material bonded to said mat surface of the base portion;
electro-conductive circuit foil means adhesively bonded to said layer of dielectric material, the coefficient of thermal expansion of said foil means being not less than the coefficient of the thermal expansion of said base portion and not more than ten times the coefficient of thermal expansion of said base portion; and
a layer of adhesive material bonding said circuit foil means to said layer of dielectric material, said adhesive remaining flexible after curing.

2. A cooking unit as in claim 1 wherein:
said layer of dielectric material is a discrete sheet of flexible material adhesively bonded to said base portion.

3. A cooking unit as in claim 2 including:
a layer of adhesive material bonding said dielectric sheet to said base, said layer of adhesive material between said base portion and said dielectric sheet being of the same material as the layer of adhesive material between said dielectric sheet and said circuit foil means.

4. A cooking unit as in claim 1 wherein:
said cooking element is formed of metal; and
said base portion is a layer of electrically insulating material applied to said metal.

5. A cooking unit as in claim 4 wherein: said electrically insulating material is porcelain.

6. A cooking unit including
a cooking element formed of material selected from the group consisting of glass and ceramic;
a base portion part of said cooking element having a mat surface;
a layer of dielectric material bonded to said mat surface of the base portion;
electro-conductive circuit foil means adhesively bonded to said layer of dielectric material, the coefficient of thermal expansion of said foil means being not less than the coefficient of thermal expansion of said cooking unit material and not more than ten times the coefficient of thermal expansion of said cooking unit material; and
a layer of adhesive material bonding said circuit foil means to said layer of dielectric material, said adhesive remaining flexible after curing.

7. A cooking unit as in claim 6 wherein:
said layer of dielectric material is a discrete sheet of flexible material adhesively bonded to said base portion.

8. A cooking unit as in claim 7 including:
a layer of adhesive material bonding said dielectric sheet to said base, said layer of adhesive material between said base portion and said dielectric sheet being of the same material as the layer of adhesive material between said dielectric sheet and said circuit foil means.

9. A cooking unit as in claim 5 wherein:
said layer of dielectric material is a sheet of alumina-silica fiber material.

* * * * *

UNITED STATES PATENT OFFICE
CERTIFICATE OF CORRECTION

PATENT NO. : 3,869,596
DATED : March 4, 1975
INVENTOR(S) : John R. Howie

It is certified that error appears in the above-identified patent and that said Letters Patent are hereby corrected as shown below:

Column 4, line 33, after "area," the phrase "the central area" was omitted.

Claim 9 should be dependent upon claim 6 rather than on claim 5.

Signed and sealed this 20th day of May 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,869,596  Dated March 4, 1975

Inventor(s) John R. Howie

It is certified that error appears in the above-identified patent and that said Letters Patent are hereby corrected as shown below:

In Fig. 3, change "PYROCERAM" to -- GLASS-CERAMIC --.

Column 1, rewrite lines 6-10 as, -- popular brands of such cookware is that known as Corning Ware, a cookware made from a glass-ceramic material (Corning Ware being a registered trademark of --.

Column 1, line 37, change "Corningware" to -- Corning Ware --.

Column 2, line 17, change "pyroceramic" to -- glass-ceramic --.

Column 2, line 38, change "Pyroceram ceramic" to -- a glass-ceramic --.

Column 2, line 39, change "in the form of Corningware" to -- as Corning Ware --.

Column 2, line 48, change "Pyroceram ceramic" to -- glass-ceramic --.

Column 2, line 56, change "Pyroceram ceramic" to -- glass-ceramic --.

Column 2, line 62, change "Pyroceram and Corningware" to -- the glass-ceramic material --.

UNITED STATES PATENT OFFICE
CERTIFICATE OF CORRECTION

Patent No. 3,869,596  Dated March 4, 1975

Inventor(s) John R. Howie  Page 2 of 2

It is certified that error appears in the above-identified patent and that said Letters Patent are hereby corrected as shown below:

Column 2, line 64, change "Pyroceram" to -- glass-ceramic --.

Column 2, line 67, change "Pyroceram 9608 ceramic" to -- the 9608 glass-ceramic --.

Column 3, line 36, change "Pyroceram" to -- the glass-ceramics --.

Signed and Sealed this

Third Day of January 1978

[SEAL]

Attest:

RUTH C. MASON
*Attesting Officer*

LUTRELLE F. PARKER
*Acting Commissioner of Patents and Trademarks*